UNITED STATES PATENT OFFICE 2,420,730

TREATMENT OF POLYMERS WITH ACYLAMIDES AND ALDEHYDES

David W. Woodward, Wilmington, Del., assignor to E. I. du Pont de Nemours & Company, Wilmington, Del., a corporation of Delaware No Drawing. Application June 9, 1944, Serial No. 539,605

11 Claims. (Cl. 260—226)

This invention relates to new nitrogen containing polymers and more particularly to new polymeric amidomethyl ethers and methods for their preparation.

Hydroxyl containing polymers such as cellulose in its various forms and cellulose derivatives have been treated with formaldehyde and basic compounds to render the materials crease resistant. This process of the prior art is a heterogeneous one; i. e., the cellulosic material in solid form was treated with a solution of formaldehyde and the basic material and the resulting modified cellulosic material were insoluble.

It is an object of this invention to prepare new soluble polymeric amidomethyl ethers by a simple process from inexpensive raw materials. It is a further object to prepare high molecular weight, linear, polymeric amidomethyl ethers which, being organic solvent soluble, are suitable for the preparation of films, fibers, and coating compositions. Another object is to prepare amidomethylcellulose acetate derivatives having decreased water absorption. Other objects will appear hereinafter.

These objects are accomplished by the following invention wherein linear, high molecular weight, organic solvent soluble, hydroxyl containing, macromolecular polymers are reacted with formaldehyde and a monoamide having at least one hydrogen attached to amido nitrogen in a homogeneous system in the presence of an acidic catalyst, preferably at a temperature below 60° C. The invention also includes within its scope the novel, organic solvent soluble, polymeric amidomethyl ethers.

The organic solvent soluble, hydroxylated polymer is preferably reacted with an amido hydrogen containing monoamide and para-formaldehyde in an organic solvent in the presence of an acidic catalyst at a temperature of from 20° to 60° C. for 0.5 to 3 hours. It is often advantageous to react the amide with formaldehyde first and then add the resulting N-methylol amide to the polymer solution. In general, equimolar quantities of formaldehyde and amide are employed and from 0.5 to 5 mols each are used per hydroxyl group in the polymer.

In order that the invention may be more fully understood, the following examples are given by way of illustration. Parts are by weight.

Example I

To 9 parts of polyvinyl alcohol dissolved in 35 parts of 90% formic acid at 50° C. are added with stirring 3 parts of para-formaldehyde in 15 parts of 90% formic acid, and 15 parts of N-amylbenzamide. Upon continued stirring at 50° C., a clear solution is obtained. After one hour at 50° C., the reaction mixture is added to methanol with stirring. The soft, rubbery precipitate is washed thoroughly with methanol and dried at 50° C. The product analyzes for 1.24% N or for one N-amylbenzamidomethyl group per 23 hydroxyl groups of polyvinyl alcohol. The amidomethylpolyvinyl alcohol is soluble in acetone, dioxane and formic acid.

Example II

A mixture prepared by warming 59.7 parts of N-ethyl, o-, p-toluenesulfonamide, 9 parts of paraformaldehyde and 12.5 parts of acetic acid containing 0.27 part of sulfuric acid is added with stirring to 27 parts of cellulose acetate (56% combined acetic acid; 0.5 hydroxyl group per glucose unit) dissolved in 120 parts of acetic acid. After one hour at 30° C., 5 parts of sodium acetate is added and the reaction mixture diluted with a mixture of 64 parts methanol and 80 parts acetic acid. A fluffy white solid is obtained by pouring the reaction mixture slowly with stirring into 1,200 parts of methanol. The product is thoroughly washed with methanol and water and dried at 60° C. The resulting derivative analyzes for 0.52% N and 50.4% combined acetic acid. This indicates introduction of 0.11 amidomethyl substituent per glucose unit. The 24 hour water absorption values of unplasticized and plasticized (20% triphenyl phosphate) films are 9.8% and 3.7% respectively. Unplasticized and plasticized (20% triphenyl phosphate) films from the unmodified cellulose acetate have 24 hour water absorption values of 14.3% and 6.5% respectively.

The water absorption values are determined by the following method. A 4 by 10 inch film (approximately 5 mil thick) which has been dried at 105° C. for 2 hours and cooled in a desiccator is weighed and then placed in water. After 24 hours, the film is quickly wiped with cheesecloth and reweighed. The per cent water absorption is determined by dividing the gain in weight by the original dry weight and multiplying by 100.

Example III

Cotton linters (7.5 parts) and 60 parts of acetic acid are placed in a flask, stirred, and kept at 40° C. for one hour. The mixture is cooled to 20° C. and 15 parts of acetic acid containing 0.45 part of sulfuric acid added. After one hour at 20° C., 22.5 parts of acetic anhydride is added and the mixture stirred at frequent intervals during the next hour at 20° C. and the following two hours at room temperature. During this time, most of the fibers disappear and the acetylation is completed at 40° C. in one hour. To the clear acetylation mixture is added with stirring, 27 parts of 60% acetic acid containing 0.38 part of sulfuric acid. After 15 hours at 41° C., a solution prepared by warming 25.8 parts of N-ethyl o-, p-toluenesulfonamide, 3.9 parts para-formaldehyde, and 10 parts of acetic acid containing 0.001 part of sulfuric acid is added to the saponification mixture which is then warmed for two hours at 50° C. Five parts of sodium acetate in 200 parts of 50% aqueous acetic acid is added to the reaction mixture which is then poured in a thin stream into 1,200 parts of methanol with stirrings. The finely divided product is washed thoroughly with methanol and water and dried at 65° C. The product analyzes for 0.54% N and 50.3% combined acetic acid. This corresponds to the introduction of 0.11 N-ethyltoluenesulfonamidomethyl substituent per glucose unit.

*Example IV*

To 300 parts of cellulose acetate (52.7% combined acetic acid; 0.8 hydroxyl group per glucose unit) dissolved in 1,200 parts of glacial acetic acid is added with stirring a solution prepared by warming a mixture of 100 parts of para-formaldehyde, 377 parts of caprolactam, 100 parts of acetic acid, and 35 parts of 85% phosphoric acid. After the reaction mixture has been stirred for three hours at 65° C., 2,500 parts of 50% aqueous acetic acid is added with stirring and the resulting solution is poured into 12,000 parts of water at 50° C. The resulting finely divided, white solid is washed successively with water and methanol, and dried at 65° C. The resulting product is soluble in acetone and analyzes for 0.44% N and 50.2% combined acetic acid. The analytical results indicate introduction of 0.08 amidomethyl group per glucose unit.

*Example V*

To 5 parts of carefully purified, dry amidomethylcellulose acetate, prepared as described in Example IV, dissolved in 135 parts of dioxane-methanol (55–45) is added with stirring 8 parts of a 5% methanol solution of sodium methoxide. The mixture gels within a few minutes and after four hours at 25°, the precipitated material is washed thoroughly with methanol and water until free of alkali. The saponified product analyzes for 0.66% N and 0.44% combined acetic acid, or for 0.08 amidomethyl substituent per glucose unit. This shows that the amidomethyl groups are chemically combined with cellulose and are resistant to alkaline hydrolysis. The reaction, which occurs is given in the following equation:

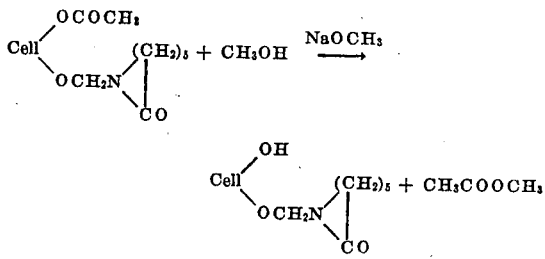

*Example VI*

To 350 parts of cellulose acetate (56% combined acetic acid; 0.5 OH/GU) in 1,300 parts of glacial acetic acid is added a solution of 197 parts of N-methylolbenzamide in 500 parts of dioxane, and 3.5 parts of p-toluene-sulfonic acid in 70 parts of acetic acid. The reaction mixture is stirred for 20 minutes at 60° C. and 50 parts of sodium acetate in 270 parts of methanol-water (45–55) is added. After dilution with 3,600 parts of methanol-water (45–55), the solution is added with stirring to 9,600 parts of methanol. The resulting, finely divided, white solid is washed thoroughly with methanol and water, and dried at 65° C. The product analyzes for 0.38% N, which corresponds to the introduction of 0.08 benzamidomethyl substituent per glucose unit. Films of this product cast from acetone solution have much lower water absorption than the original cellulose acetate.

Essentially the same results are obtained when a solution prepared by warming on the steam bath a mixture of 157 parts of benzamide, 39 parts of para-formaldehyde, 20 parts of benzene and 35 cc. of acetic acid is used in place of 197 parts of N-methylolbenzamide dissolved in 500 parts of dioxane.

When cellulose acetate film containing 12% N-methylolbenzamide and 0.5% p-toluenesulfonic acid as catalyst is heated at 125° C. for one hour, an insoluble cross-linked product results.

*Example VII*

To 30 parts of cellulose acetate (56% combined acetic acid; 0.5 OH/GU) dissolved in 100 parts of acetic acid at 70° C. is added 6 parts of para-formaldehyde and 12 parts of N-methylformamide. After thirty minutes at 70° C., the reaction mixture is added to methanol and the resulting precipitated product washed thoroughly with methanol. The product contains 0.05% N.

*Example VIII*

To 30 parts of cellulose acetate (56% combined acetic acid; 0.5 OH/GU) dissolved in 100 parts of acetic acid is added a mixture of 35 parts of caprolactam, 10 parts of para-formaldehyde, 3.3 parts of 85% phosphoric acid and 10 parts of glacial acetic acid. After the mixture is stirred for one hour at 65° C., the product is precipitated by the addition of the reaction mixture to a solution of 90 parts of concentrated ammonium hydroxide in 4,000 parts of water, washed with water and methanol, and dried. The product contains 0.86% N which corresponds to 0.18 amido-methyl group per glucose unit. Films of this derivative cast from acetone solution have substantially lower water absorption values than similar films prepared from the original cellulose acetate.

In carrying out the process of this invention, there can be employed any organic solvent soluble, linear, high molecular weight, i. e., macromolecular, polymer containing unsubstituted hydroxyl groups. Suitable hydroxyl containing polymers include cellulose acetate, cellulose acetate butyrate, cellulose nitrate, ethylcellulose, polyvinyl alcohol, hydrolyzed vinyl acetate interpolymers and polyvinyl butyral. Cellulose derivatives having from 0.1 to 1.5 unsubstituted hydroxyl groups per glucose unit are especially suited for use in this reaction since they react readily and are commercially available at low cost. Cellulose acetate is preferred because it reacts with exceptional ease to give undegraded, readily soluble products having lower water absorption and increased dimensional stability. Furthermore, the reaction can be carried out readily in conjunction with the preparation of acetone soluble secondary cellulose acetate.

Amides which contain at least one hydrogen attached to amido nitrogen can be employed in this invention. Suitable amides include acetamide, isobutylformamide, chloroacetamide, cyclohexylformamide, benzamide, acetanilide, p-toluenesulfonamide, benzanilide N-ethyltoluenesulfonamide, caprolactam, phenylurethane and stearamide. Amides having straight chain radicals of up to seven carbon atoms and in general amides of less than eight carbon atoms are preferred since they react much more efficiently. Sulfonamides form a preferred class of reactants since they react more readily than carbonamides, particularly in the presence of 1% to 10% water. Accordingly, sulfonamides are especially useful when the reaction is carried out in conjunction with the hydrolysis step in the preparation of acetone soluble cellulose acetate.

Although any aliphatic aldehyde can be used in this invention, formaldehyde, or a substance capable of liberating formaldehyde is preferred since it is outstanding in reactivity. The use of aldehydes such as acetaldhyde or chloral results in products having a much lower degree of amidomethyl substitution.

In place of amide and formaldehyde, a precondensed N-methylolamide can be used. The amide and formaldehyde can be added to the reaction mixture separately, or they can be heated together in the presence of a solvent and catalyst, and then added.

Suitable inert reaction solvents include acetic acid, benzene, dioxane, 1,2-dimethoxyethane, toluene, dibutyl ether, methylene dichloride, and formic acid. The choice of solvent will depend largely upon the polymer and amide used. With cellulose acetate, for example, acetic acid is an excellent solvent while benzene is suitable for use with ethylcellulose. Since the presence of water lowers reaction efficiency, particularly when carbonamides are employed, it is desirable to use dry reagents and solvents. Reaction efficiency can be further increased by removing water formed during the course of the reaction by azeotropic distillation, or by reaction of the water with an added agent such as acetic anhydride.

Reaction occurs readily at room temperature, i. e., 20° C. although temperatures up to 100° C. or higher can be used for a short time. When the reaction is carried out in conjunction with the hydrolysis of primary cellulose acetate to an acetone soluble, secondary acetate, it is desirable to employ a temperature in the range of 40° to 65° C. in order to accelerate the hydrolysis. The use of temperatures below 60° C. has the advantage of avoiding undesirable side reactions and degradation of the polymers, particularly in the case of cellulose derivatives.

Acidic catalysts may be employed including acids such as sulfuric, phosphoric, hydrochloric, acetic and p-toluenesulfonic acid, and salts such as ammonium chloride, sodium acid sulfate and monoammonium phosphate.

The products of this invention, being organic solvent soluble, are useful in the preparation of films, fibers, plastics, and coating compositions.

The products of this invention are derivatives of organic solvent soluble, macromolecular, i. e., high molecular weight, linear polymers wherein hydroxyl groups of the polymer are replaced by radicals of the formula:

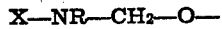

where X is the non-hydroxyl portion of a monobasic organic acid and R is hydrogen or hydrocarbon. Thus X may be acetyl, formyl, chloroacetyl, benzoyl or other acyl group. R may be phenyl, ethyl, isobutyl, etc.

The above description and examples are intended to be illustrative only. Any modification thereof or variation therefrom which conforms to the spirit of the invention is intended to be included within the scope of the claims.

What is claimed is:

1. Process which comprises reacting, at 20–60° C. for 0.5 to 3 hours in solution in a substantially anhydrous, inert, liquid, organic solvent and in the presence of an acidic catalyst, (1) formaldehyde and (2) an organic acid amide of a monoamine with an organic monobasic acid of the class consisting of carboxylic acids and sulfonic acids, said amide having hydrogen on the amido nitrogen, in the ratio of approximately one mol of aldehyde per mol of amide, with (3) an organic solvent soluble cellulose ester.

2. Process which comprises reacting, at 20–60° C. for 0.5 to 3 hours in solution in a substantially anhydrous, inert, liquid, organic solvent and in the presence of an acidic catalyst, (1) an aliphatic monoaldehyde and (2) an organic amide of a monoamine with an organic monobasic acid of the class consisting of carboxylic acids and sulfonic acids, said amide having hydrogen on the amido nitrogen, in the ratio of approximately one mol of aldehyde per mol of amide, with (3) an organic solvent soluble cellulose ester.

3. Process which comprises reacting, at 20–60° C. for 0.5 to 3 hours in solution in a substantially anhydrous, inert, liquid, organic solvent and in the presence of an acidic catalyst, (1) formaldehyde and (2) an organic acid amide of a monoamine with an organic monobasic acid of the class consisting of carboxylic acids and sulfonic acids, said amide having hydrogen on the amido nitrogen, in the ratio of approximately one mol of aldehyde per mol of amide, with (3) an organic solvent soluble cellulose acetate.

4. Process which comprises reacting, at a temperature between 20° and 60° C. in solution in a substantially anhydrous, inert, liquid, organic solvent and in the presence of an acidic catalyst, (1) formaldehyde and (2) an organic sulfonamide of a monoamine with a monobasic organic sulfonic acid, said amide having hydrogen on the amido nitrogen, in the ratio of approximately one mol of aldehyde per mol of amide, with (3) a cellulose ester.

5. Process which comprises reacting, at a temperature between 20° and 60° C. in solution in a substantially anhydrous, inert, liquid, organic solvent and in the presence of an acidic catalyst, (1) formaldehyde and (2) an organic sulfonamide of a monoamine with a monobasic organic sulfonic acid, said amide having hydrogen on the amido nitrogen, in the ratio of approximately one mole of aldehyde per mol of amide, with (3) a cellulose acetate.

6. Process which comprises reacting, at a temperature between 20° and 60° C. in solution in a substantially anhydrous, inert, liquid, organic solvent and in the presence of an acidic catalyst, (1) formaldehyde and (2) an organic sulfonamide of a monoamine with a monobasic organic sulfonic acid, said amide having hydrogen on the amido nitrogen, in the ratio of approximately one mol of aldehyde per mol of amide, with (3) a cellulose acetate having from 0.1 to 1.5 hydroxyls per glucose unit.

7. Process of claim 6 wherein the cellulose acetate is formed in situ during the reaction by hydrolysis of a primary cellulose acetate.

8. Process of claim 6 wherein the amide is of less than eight carbon atoms.

9. An organic solvent soluble cellulose acetate having cellulosic hydroxyl hydrogen replaced by a radical of the formula $$X-NR-CH_2-$$

where X is the non-hydroxyl portion of a monobasic organic acid of the class consisting of carboxylic acids and sulfonic acids and R is a member of the class consisting of hydrogen and monovalent hydrocarbon radicals.

10. A cellulose acetate according to claim 9 wherein X is an organic sulfonyl radical.

11. An organic solvent soluble cellulose ester having cellulosic hydroxyl hydrogen replaced by a radical of the formula $$X-NR-CH_2-$$

where X is the non-hydroxyl portion of a monobasic organic acid of the class consisting of carboxylic acids and sulfonic acids and R is a member of the class consisting of hydrogen and monovalent hydrocarbon radicals.

DAVID W. WOODWARD.

REFERENCES CITED

The following references are of record in the file of this patent:

UNITED STATES PATENTS

| Number | Name | Date |
|---|---|---|
| 1,672,848 | Lauter | June 5, 1928 |
| 2,118,685 | Stadler | May 24, 1938 |
| 2,270,841 | Bock | Jan. 27, 1942 |
| 2,331,376 | D'Alelio | Oct. 12, 1943 |
| 2,332,302 | D'Alelio | Oct. 19, 1943 |
| 1,954,729 | Dreyfus et al. | Apr. 10, 1934 |

FOREIGN PATENTS

| Number | Country | Date |
|---|---|---|
| 361,910 | Great Britain | Nov. 16, 1931 |